United States Patent Office 3,439,093
Patented Apr. 15, 1969

3,439,093
6 - HALOGEN - 1α,2α - METHYLENE - 16α - METHYL - Δ[4,6] - PREGNADIENE - 17α - OL - 3,20 - DIONES AND THE 17-ESTERS
Josef Hader, Friedmund Neumann, and Rudolf Wiechert, Berlin, Germany, assignors to Schering AG, Berlin, Germany
No Drawing. Filed Oct. 12, 1965, Ser. No. 495,341
Claims priority, application Germany, Oct. 13, 1964, Sch 35,945
Int. Cl. A61k 17/06
U.S. Cl. 424—243
11 Claims

ABSTRACT OF THE DISCLOSURE

A compound of the formula

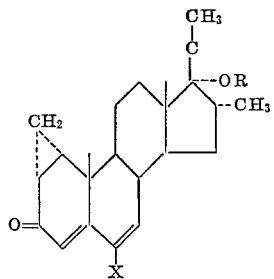

wherein R is a member selected from the group consisting of hydrogen and carboxylic acyl and X is a member selected from the group consisting of chlorine and fluorine.

A specific example of the compound is 6-chlor-1α,2α-methylene - 16α - methyl - Δ[4,6]-pregnadiene-17α-ol-3,20-dione.

The compound has strong progestational and ovulation inhibiting effects.

This invention relates to novel 6-halogen-1α,2α-methylene - 16α - methyl - Δ[4,6]-pregnadiene-17α-ol-3,20-diones and the 17-esters thereof and methods used in the production thereof.

The novel products of this invention include those represented by the formula:

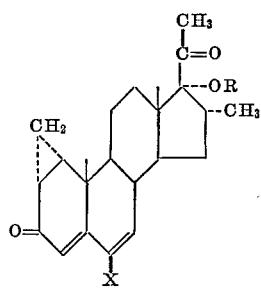

wherein R represents hydrogen or acyl and X is fluorine or chlorine. R preferably represents the acyl radical of an organic carboxylic acid, most preferably a hydrocarbon carboxylic acid containing from one to twelve carbon atoms, inclusive.

The novel compounds of the above formula possess useful therapeutic properties. They have markedly progestational activities. Furthermore, they have proved effective in inhibition of ovulation.

Compositions containing the compounds of the present invention can be prepared for use by incorporating them in any one of the several dosage forms suitable for such use. Administration of the novel steroids thus can be in conventional dosage forms such as pills, tablets, capsules and the like.

The novel compounds of the present invention can be prepared in accordance with the following reaction scheme:

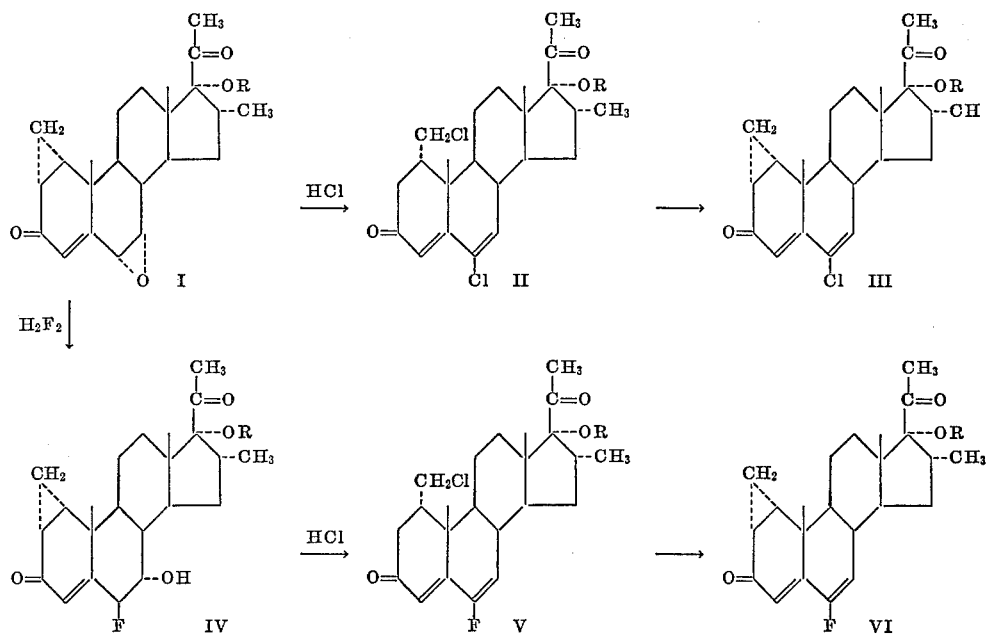

wherein R has the same meaning as previously given.

The novel steroids of this invention are prepared by a process wherein, $6\alpha,7\alpha$ - epoxy - $1\alpha,2\alpha$-methylene-$16\alpha$-methyl-$\Delta^4$-pregnene-$17\alpha$-ol-3,20 - dione (or the 17-ester thereof) is reacted with hydrogen fluoride and/or hydrogen chloride in the conventional manner and the resulting product treated as for example with an organic base to restore the $1\alpha$-$2\alpha$-methylene ring which was opened in the hydrogen chloride treatment step. Thereafter any 17-ester which is thereby produced is optionally saponified and/or any free $17\alpha$-ol is optionally esterified with the desired acid derivative.

One of the novel processes of this invention, depicted schematically above, comprises treatment of the $6\alpha,7\alpha$-epoxy - $1\alpha,2\alpha$ - methylene-$16\alpha$-methyl-$\Delta^4$-pregnene-$17\alpha$-ol-3,20-dione-17-acetate (I) by reaction thereof with HCl in glacial acetic acid whereby the epoxide group is opened up under splitting off of water and formation of a 6-chlor-$\Delta^6$-grouping and additionally the $1\alpha$-$2\alpha$-methylene group (cyclopropane ring) is converted into a $1\alpha$-chlormethyl group forming the compound of Formula II.

The reclosing of the cyclopropane ring to give compound III is easily carried out by reacting compound II with an organic base as for instance collidine.

In carrying out another of the novel processes of this invention, also depicted schematically above, the $6\alpha,7\alpha$-epoxide (I) is reacted with hydrogen fluoride preferably in dimethyl formamide whereby the epoxide group is opened to form the $6\beta,7\alpha$-fluorohydrin (IV). The latter compound is then treated with hydrogen chloride in glacial acetic acid in order to eliminate water and form the 6-fluoro-$\Delta^6$-grouping with simultaneous opening of the cyclopropane ring to give the $1\alpha$-chloromethyl group (V). Treatment of compound V with an organic base results in the reclosing of the $1\alpha,2\alpha$-methylene group and of compound VI i.e. 6-fluor-$1\alpha,2\alpha$-methylene - $16\alpha$-methyl-$\Delta^{4,6}$-pregnadiene-$17\alpha$-ol-3,20-dione-17-acetate.

The novel steroids of the invention constitute effective gestagenic and powerful ovulation-inhibiting drugs.

The effectiveness of the compounds was established by experimental work. In the experiments the Clauberg Test using infantile rabbits was carried out. The threshold limit value was determined i.e., the smallest amount of test compound producing a gestagenic action, this being compared with values simultaneously obtained with other known effective gestagenic drugs. In addition the dose which resulted in successfully inhibiting ovulation in 50% of the tested rats ($W_D50$) was determined. The results of the experiments are set out in the table which follows.

TABLE

| Compound | Gestagenic Effect, Threshold value (mg.) | | Ovulation Inhibiting Activity, Dose in mg. $W_D50$ [mg.] per os |
|---|---|---|---|
| | Subcut. | Per os | |
| 6-chlor-$1\alpha,2\alpha$-methylene-$16\alpha$-methyl-$\Delta^{4,6}$-pregnadiene-$17\alpha$-ol-3,20-dione-17-acetate | 0.001–0.003 | 0.003 | 0.1 |
| 6-chlor-$1\alpha$-,$2\alpha$-methylene-$\Delta^{4,6}$-pregnadiene-$17\alpha$-ol-3,20-dione-17-acetate | 0.003 | 0.01 | 1.0 |
| 6-chlor-$16\alpha$-methyl-$\Delta^{4,6}$-pregnadiene-$17\alpha$-ol-3,20-dione-17-acetate | 0.01 | 0.01 | 1.0 |
| 6-chlor-$\Delta^{4,6}$-pregnadiene-$17\alpha$-ol-3,20-dione-17-acetate | 0.01 | 0.01 | 1–3 |
| $17\alpha$-ethinyl-19-nortestosterone | 0.06 | 0.1 | 3 |

As can be seen from the above 6-chlor-$1\alpha,2\alpha$-methylene - $16\alpha$ - methyl - $\Delta^{4,6}$-pregnadiene-$17\alpha$-ol-3,20-dione-17-acetate is markedly more effective than any of the comparison compounds.

As indicated above and described in greater detail below, the sequence of reactions embodied in the processes characterizing this invention is susceptible of variation, the precise order selected being determined by such factors as economics and convenience.

The starting material for the processes of Examples 1 and 2 was prepared in the following manner:

(A) $1\alpha,2\alpha$ - methylene - $16\alpha$ - methyl - $\Delta^{4,6}$ - pregnadiene - $17\alpha$ - ol - 3,20 - dione - 17 - acetate.—960 mg. trimethylsulfoxoniumiodide were dissolved in 7 ml. dimethylsulfoxide .120 mg. sodium hydride (50% oil suspension) were added to the resulting solution under nitrogen. The resulting mixture was stirred for about 2 hours under nitrogen and then 383 mg. $16\alpha$-methyl-$\Delta^{1,4,6}$-pregnatriene-$17\alpha$-ol-3,20-dione-17-acetate were introduced and the stirring continued at room temperature and under nitrogen for an additional 17 hours.

Thereafter the reaction mixture is stirred into ice water, acidified with dilute hydrochloric acid, taken up in methylene chloride, washed with water until neutral, dried over sodium sulfate and evaporated to dryness under vacuum. The recovered raw product (residue) was purified by thin layer chromatography ($SiO_2$; benzene-acetic ester, 60–40) and crystallized from isopropyl ether. There were obtained 250 mg. $1\alpha$, $2\alpha$-methylene-$16\alpha$-methyl-$\Delta^{4,6}$-pregnadiene-$17\alpha$-ol-3,20-dione-17-acetate. M.P. 201–203° C.; UV:$\epsilon_{282}=21.300$ (B) $6\alpha$ - $7\alpha$ - epoxy - $1\alpha$ - $2\alpha$ - methylene - $16\alpha$ - methyl - $\Delta^4$ - pregnene - $17\alpha$ - ol - 3,20 - dione - 17 - acetate.— 800 mg. $1\alpha,2\alpha$ - methylene - $16\alpha$ - methyl - $\Delta^{4,6}$ - pregnadiene-$17\alpha$ - ol - 3,20 - dione - 17 - acetate were dissolved in 40 ml. tertiary butanol. Then while stirring and at a temperature of 25° C. 737 mg. m-chlorperbenzoic acid were introduced into the solution. After 3 days of standing, the reaction mixture was stirred into ice water, extracted with acetic ester and washed in sequence with dilute iron (II) sulfate solution, 5% sodium bicarbonate solution and water. Thereafter the reaction mixture is dried over sodium sulfate, filtered, and evaporated to dryness under vacuum. The residue was then crystallized out of isopropylether. There were recovered 650 mg. (78% of theory) of $6\alpha,7\alpha$-epoxy-$1\alpha,2\alpha$-methylene-$16\alpha$-methyl - $\Delta^4$ - pregnene - $17\alpha$ - ol - 3,20 - dione - 17 - acetate. M.P. 248.5–251° C.; UV:$\epsilon_{234}=12.200$.

The following examples are illustrative of the present invention, but are not to be construed as limiting

EXAMPLE 1

6-chlor-$1\alpha,2\alpha$-methylene-$16\alpha$-methyl-$\Delta^{4,6}$-pregnadiene-$17\alpha$-ol-3,20-dione-17-acetate 500 mg. $6\alpha,7\alpha$ - epoxy - $1\alpha,2\alpha$ - methylene - $16\alpha$ - methyl - $\Delta^4$ - pregnene - $17\alpha$ - ol - 3,20 - dione - 17 - acetate were dissolved in 33 ml. glacial acetic acid. Thereafter over a 2 hour period and at a temperature of 17° C. dry hydrogen chloride gas was introduced into the resulting solution. The reaction mixture which was thereby produced was allowed to stand overnight, thereafter stirred into ice water, extracted with methylene chloride, washed with water to neutrality, dried over sodium sulfate and evaporated to dryness in vacuum. The recovered raw product had a UV absorption of $\epsilon_{285-287}=16.000$ and was identified as $1\alpha$-chlormethyl-6-chlor - $16\alpha$ - methyl - $\Delta^{4,6}$-pregnadiene-$17\alpha$-ol-3,20-dione-17-acetate. This raw product was without further purification dissolved in 10 ml. freshly distilled collidine and refluxed for 30 minutes under nitrogen. Following cooling of the reaction mixture, it was diluted with ether and the ether phase washed with 3 N aqueous hydrochloric acid and then with water. Following drying over sodium sulfate and evaporation in vacuum, the residue was crystallized out of isopropyl ether which had been treated with charcoal.

There were recovered 260 mg. 6-chlor-1α-2α-methylene - 16α - methyl - $\Delta^{4,6}$ - pregnadiene - 17α - ol - 3,20-dione-17-acetate. Before further analysis a sample was recrystallized out of isopropylether. M.P. 209° C.;

$$UV: \epsilon_{282} = 17.400$$

EXAMPLE 2

6-fluor-1α,2α-methylene-16α-methyl-$\Delta^{4,6}$-pregnadiene-17α-ol-3,20-dione-17-acetate 3 g. 6α,7α - epoxy - 1α,2α - metylene - 16α - methyl-$\Delta^4$ - pregnene - 17α - ol - 3,20 - dione - 17 - acetate was introduced in portions and with stirring at —60° C. into a freshly prepared solution of hydrogen fluoride in dimethyl formamide (the acid solution was prepared by condensing 15 ml. hydrogen fluoride and then combining the condensate with 15 ml. dimethyl formamide at —60° C.).

After 30 minutes have elapsed the reaction mixture was cooled to —20° C. and after another 30 minutes the temperature was brought to 0° C. Thereafter the reaction mixture was warmed up to room temperature and allowed to stand at this temperature for 3 hours. It was at the end of this time introduced into a 10% potassium bicarbonate solution. The resulting precipitate was separated by suction filtering, washed with water taken up in methylene chloride and again washed with water. Following drying over sodium sulfate it was concentrated in vacuum. The concentrate was chromatographed using 300 g. silica gel and 10% water and extracted with a mixture of tetrachlorhydrocarbon/methylenechloride/chloroform. There was thereby obtained 850 mg. 6β-fluor-1α,2α-methylene-16α - methyl - $\Delta^4$ - pregnene - 7α - 17α - diol - 3,20 - di-one-acetate. M.P. 298–300° C.; UV: $\epsilon_{231}$=11.600.

To a solution of 850 mg. 6β-fluor-1α,2α-methylene-16α - methyl - $\Delta^4$ - pregnene - 7α,17α - diol - 3,20 - dione-17-acetate in 150 ml. glacial acetic acid there was introduced for 4½ hours at 15° C. dry hydrogen chloride gas. At the end of this period, the reaction mixture was permitted to stand for 24 hours at room temperature and then stirred into ice water. The precipitate which was formed was separated off by suction filtering, taken up in methylenechloride, washed till neutral with water, dried over sodium sulfate and concentrated in vacuum. The crude 6-fluor - 1α - chlormethyl - 16α - methyl - $\Delta^{4,6}$-pregnadiene - 17α - ol - 3,20 - dione - 17 - acetate which was thusly obtained was dissolved in 20 ml. collidine and heated for 20 minutes under nitrogen to boiling. Thereafter it was diluted with ether, washed with 3 N hydrochloric acid followed by a washing with water, drying over sodium sulfate and concentration in vacuum. The residue which was recovered is crystallized out isopropyl ether. There was thereby recovered 6-fluor-1α,2α-methylene - 16α - methyl - $\Delta^{4,6}$ - pregnadiene - 17α - ol - 3,20-dione-17-acetate. M.P. 242.5–243° C.; UV: $\epsilon_{280}$=18.900.

EXAMPLE 3

6-chlor-1α,2α-methylene-16α-methyl-$\Delta^{4,6}$-pregnadiene-17α-ol-3,20-dione 400 mg. 6 chlor-1α,2α-methylene-16α-methyl-$\Delta^{4,6}$-pregnadiene-17α-ol-3,20-dione-17-acetate were dissolved in 40 ml. 0.5 N ethanolic sodium hydroxide. Following the addition of 400 mg. NaClO₄ to the resulting solution, the reaction mixture was heated to boiling under nitrogen. The cooled reaction mixture is thereafter stirred into icewater, acidified wth dilute HCl and extracted with CH₂Cl₂. Following separation of the methylenechloride phase, washing, drying and evaporation, there is produced a residue which is crystallized out of methanol under treatment with charcoal. There were recovered 180 mg. 6-chlor-1α,2α - methylene - 16α - methyl-$\Delta^{4,6}$-pregnadiene-17α-ol-3,20-dione. M.P. 229–230.5° C.; UV: $\epsilon_{282}$=17.500.

EXAMPLE 4

6-chlor-1α,2α-methylene-16α-methyl-$\Delta^{4,6}$-pregnadiene-17α-ol-3,20-dione-17-capronate 180 mg. 6-chlor-1α,2α-methylene-16α-methyl-$\Delta^{4,6}$-pregnadiene-17α-ol-3,20-dione were dissolved in 5.5 ml. capronic acid anhydride. Following the addition of 70 mg. pTsOH the reaction mixture was allowed to stand for 4 days at room temperature under nitrogen. Thereafter the excess capronic-acid anhydride is removed by steam distillation and the resulting residue taken up in CH₂Cl₂, washed with dilute NaHCO₃ solution as well as with water. Following drying over Na₂SO₄ and concentrating in vacuum, there were recovered 110 mg. 6-chlor-1α,2α-methylene - 16α - methyl - $\Delta^{4,6}$ - pregnadiene-17α-ol-3,20-dione-17-capronate as a viscous oil. UV: $\epsilon_{281}$=16.500.

EXAMPLE 5

6-fluor-1α,2α-methylene-16α-methyl-$\Delta^{4,6}$-pregnadiene-17α-ol-3,20-dione 200 mg. 6-fluor-1α,2α-methylene-16α-methyl-$\Delta^{4,6}$-pregnadiene-17α-ol-3,20-dione-17-acetate were dissolved in 20 ml. of a mixture of methanol and ethanol (80+20). 400 mg. NaOH and 200 mg. LiClO₄ were added to the resulting solution and the reaction mixture thus obtained heated for 20 minutes under nitrogen to boiling. The cooled reaction solution was then stirred into icewater, acidified with dilute HCl and extracted with CH₂Cl₂. After washing, drying and concentrating in vacuum, the recovered residue was crystallized from methanol.

The 6-fluor-1α,2α-methylene-16α-methyl-$\Delta^{4,6}$-pregnadiene - 17α - ol - 3,20 - dione which was thusly recovered amounted to 80 mg. M.P. 235–237° C.; UV: $\epsilon_{282}$=18.800.

EXAMPLE 6

6-α-fluor-1α,2α-methylene-16α-methyl-$\Delta^{4,6}$-pregnadiene-17α-ol-3,20-dione-17-capronate 170 mg. 6-fluor-1α,2α-methylene-16α-methyl-$\Delta^{4,6}$-pregnadiene-17α-ol-3,20-dione were dissolved in 5.0 ml. capronic acid anhydride. 70 mg. pTsOH were then added and the resulting mixture allowed to stand for 4 days at room temperature under nitrogen. The excess capronic acid anhydride was separated off through steam distillation and the residue taken up in CH₂Cl₂, washed with dilute NaHCO₃ solution and then with water, dried and evaporated. The oily residue which was recovered could not be crystallized. UV: $\epsilon_{280}$=16.400.

Clinical testing and applications of 6-chlor-1,2α-methylene - 16α - methyl - $\Delta^{4,6}$-pregnadiene-17α-ol-3,20-dione-17α-acetate The strong progestational activity of the steroid of the invention was demonstrated by clinical tests involving human subjects in which capsules containing 1 mg. of the compound above set out were employed.

(I) Clinical tests (A) Endometrial response in the castrate or in the female with long term amenorrhea.—Following treatment with estrogen and following administration of 20 mg. (total dose) of the above compound a complete transformation of the endometrium was observed. All of the criteria for such transformation as for instance glycogen formation in the glands and in the stroma loosening of the stroma, formation of dilated spiral arteries were observed.

(B) Menstruation shifting.—With a daily dosage of 2–3 mg. of the above compound, which has to be administered 3–4 days before the supposed menstrual term, it is possible to inhibit the normal menstrual bleeding.

(II) Clinical applications

On the basis of the clinical tests, the following gynecological applications were projected and confirmed:

(A) Short duration amenorrhea.—For 2 days, 5 mg. of the above compound and 40γ ethinylestradiol were administered. After about 5 days withdrawal bleeding simulating normal menstruation occurred.

(B) Long duration amenorrhea.—Pretreatment with 20 mg. Progynon depot (estradiolvalerinate). This injection was repeated on about the 14th day followed by administration on the 19–26th cycle day of 5 mg. of the compound above resulting in withdrawal bleeding.

(C) Endometriosis.—Treatment with 5–10 mg. daily of the compound of the invention for a period of about 4–6 months resulted in substantial amelioration of symptoms of this disease.

(D) Uterus - hypoplasia.—Pseudopregnancy was induced by weekly administration of 20 mg. Progynon depot and daily doses starting with 5, then 10 and finally 15 mg. of the compound of the invention. The course of treatment amounted to about 7–8 weeks.

(E) Dysfunctional bleeding (glandular cystic) hyperplasia.—For 10 days, 5 mg. of the compound of the invention and 40γ ethinylestradiol were administered. In the case of dysfunctional bleeding, bleeding ceased within 24–48 hrs. A menstrual like bleeding was established following this treatment.

It is to be understood that the invention is not to be limited to the exact details of operation or exact compounds shown or described, as obvious modifications and equivalents will be apparent to one skilled in the art and the invention is therefore to be limited only by the scope of the appended claims.

We claim:
1. A compound of the formula

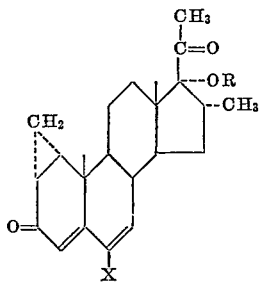

wherein R is a member selected from the group consisting of hydrogen and carboxylic acyl and X is a member selected from the group consisting of chlorine and fluorine.

2. 6-chlor-1α,2α-methylene-16α-methyl - $\Delta^{4,6}$ - pregnadiene-17α-ol-3,20-dione.

3. 6-chlor-1α,2α-methylene-16α-methyl - $\Delta^{4,6}$ - pregnadiene-17α-ol-3,20-dione-17-acetate.

4. 6-chlor-1α,2α-methylene-16α-methyl - $\Delta^{4,6}$ - pregnadiene-17α-ol-3,20-dione-17-capronate.

5. 6-fluor-1α,2α-methylene-16α - methyl - $\Delta^{4,6}$ - pregnadiene-17α-ol-3,20-dione.

6. 6-fluor-1α,2α-methylene-16α - methyl - $\Delta^{4,6}$ - pregnadiene-17α-ol-3,20-dione-17-acetate.

7. 6-fluor-1α,2α-methylene-16α - methyl - $\Delta^{4,6}$ - pregnadiene-17α-ol-3,20-dione-17-capronate.

8. A gestagenic and ovulation inhibiting composition comprising as active ingredient a compound of the formula

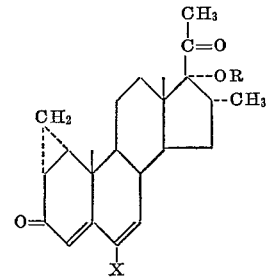

wherein R is a member selected from the group consisting of hydrogen and carboxylic acyl and X is a member selected from the group consisting of chlorine and fluorine; and a pharmaceutical carrier for said compound.

9. The method for inducing a gestagenic and ovulation inhibiting effect in humans and animals comprising orally administering a total dose of at least 6 mg. of a compound having the formula

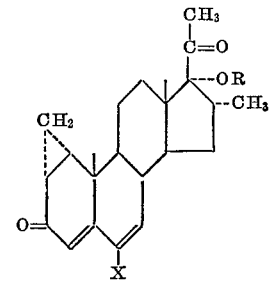

wherein R is a member selected from the group consisting of hydrogen and carboxylic acyl and X is a member selected from the group consisting of chlorine and fluorine.

10. The method of claim 9 wherein said compound is 6-chlor-1α,2α-methylene-16α-methyl - $\Delta^{4,6}$ - pregnadiene-17α-ol-3,20-dione-17-acetate.

11. The composition of claim 8 wherein said active ingredient is 6-chlor-1α,2α-methylene,16α-methyl-$\Delta^{4,6}$-pregnadiene-17α-ol-3,20-dione-17-acetate.

References Cited
UNITED STATES PATENTS
3,234,093   2/1966   Weichert _____ 266—397.4

ELBERT L. ROBERTS, Primary Examiner.

U.S. Cl. X.R.
260—239.55, 397.4